(12) United States Patent
Hattori

(10) Patent No.: US 11,064,080 B2
(45) Date of Patent: Jul. 13, 2021

(54) IMAGE PROCESSING APPARATUS, TRAY SETTING METHOD, AND NON-TRANSITORY STORAGE MEDIUM STORING INSTRUCTIONS EXECUTABLE BY THE IMAGE PROCESSING APPARATUS

(71) Applicant: Brother Kogyo Kabushiki Kaisha, Nagoya (JP)

(72) Inventor: Yuka Hattori, Mizuho (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/823,784

(22) Filed: Mar. 19, 2020

(65) Prior Publication Data
US 2020/0314266 A1    Oct. 1, 2020

(30) Foreign Application Priority Data

Mar. 28, 2019    (JP) .............................. JP2019-063712

(51) Int. Cl.
*H04N 1/00*    (2006.01)
(52) U.S. Cl.
CPC ..... *H04N 1/00411* (2013.01); *H04N 1/00477* (2013.01); *H04N 1/00663* (2013.01)
(58) Field of Classification Search
USPC ....... 355/407–408; 358/1.1–3.29, 1.11–1.18, 358/498; 398/9–17; 399/9–18, 45, 75, 399/81–86, 367–377, 386–393
See application file for complete search history.

(56) References Cited

U.S. PATENT DOCUMENTS

| | | | | |
|---|---|---|---|---|
| 2011/0044715 A1* | 2/2011 | Ogata | ................ | G03G 15/6552 399/81 |
| 2014/0376026 A1* | 12/2014 | Inui | ...................... | B41J 13/0054 358/1.14 |
| 2016/0041794 A1* | 2/2016 | Futatsumori | ......... | H04N 1/0032 358/1.15 |

FOREIGN PATENT DOCUMENTS

JP    2016-036979 A    3/2016

* cited by examiner

*Primary Examiner* — Marcellus J Augustin
(74) *Attorney, Agent, or Firm* — Burr & Brown, PLLC

(57) ABSTRACT

An image processing apparatus includes a tray and a sensor provided for the tray and configured to sense that a particular operation is performed for the tray. A controller is configured to: register tray relating information; when the particular operation is performed for a first tray as the tray, and first-tray information indicating a setting item associated with the first tray is registered as the registered tray relating information, display a tray-setting screen that accepts an input for a setting item for the recording medium to be placed on the first tray and that contains a related-setting-item object indicating the setting item, of the registered first-tray information, which is associated with the first tray; and when the related-setting-item object is selected, set the setting item corresponding to the related-setting-item object, to a setting item for a placing medium to be placed on the first tray.

14 Claims, 9 Drawing Sheets

FIG.5 <Setting Pattern 1> Custom sheet setting C2 has the following registration.
Sheet Size/Type: L Size, Glossy Paper
Frequent-use Setting: ON
Frequent-use Tray: Only First Tray

IMAGE PROCESSING APPARATUS, TRAY SETTING METHOD, AND NON-TRANSITORY STORAGE MEDIUM STORING INSTRUCTIONS EXECUTABLE BY THE IMAGE PROCESSING APPARATUS

CROSS REFERENCE TO RELATED APPLICATION

The present application claims priority from Japanese Patent Application No. 2019-063712, which was filed on Mar. 28, 2019, the disclosure of which is herein incorporated by reference in its entirety.

BACKGROUND

The following disclosure relates to an image processing apparatus configured to form an image on a recording medium placed on and then supplied from a tray, to a tray setting method, and to a non-transitory storage medium storing a plurality of instructions executable by a processor of the image processing apparatus.

There is known a printing apparatus including a plurality of sheet-supply cassettes. When insertion of the sheet-supply cassette into the printing apparatus is sensed, the printing apparatus displays a setting screen for setting information (e.g., the size and the type) on a recording medium placed on the sheet-supply cassette. Users are allowed to operate the setting screen to set the information on the recording medium placed on the inserted sheet-supply cassette.

SUMMARY

If operations of setting information on the recording medium with the setting screen are complicated, or a large number of the operations are required, the usability of the image processing apparatus is low for the users. It is desired for the users to set the information on the recording medium with the minimum number of operations.

Accordingly, an aspect of the disclosure relates to a technique for easily setting information on a recording medium to be placed on a tray.

In one aspect of the disclosure, an image processing apparatus includes: at least one tray configured to support a recording medium; a sensor provided for each of the at least one tray and configured to sense that a particular operation is performed for a corresponding one of the at least one tray; a display device; an input interface; and a controller configured to: register at least one piece of tray relating information in which one of the at least one tray and a setting item for specifying the recording medium are associated with each other; when the sensor has detected that the particular operation is performed for a first tray as one of the at least one tray, and first-tray information indicating a setting item associated with the first tray is registered as one of the registered at least one piece of tray relating information, control the display device to display a tray-setting screen for accepting an input for a setting item for the recording medium to be placed on the first tray, the tray-setting screen containing a related-setting-item object indicating the setting item, of the registered first-tray information, which is associated with the first tray; and when the related-setting-item object is selected via the input interface in a state in which the tray-setting screen is displayed, set the setting item corresponding to the related-setting-item object, to a setting item for a placing medium that is the recording medium to be placed on the first tray.

Another aspect of the disclosure relates to a tray setting method used in an image processing apparatus. The image processing apparatus includes (i) at least one tray configured to support a recording medium, (ii) a sensor provided for each of the at least one tray and configured to sense that a particular operation is performed for a corresponding one of the at least one tray, (iii) a display device, and (iv) an input interface. The tray setting method includes: registering at least one piece of tray relating information in which one of the at least one tray and a setting item for specifying the recording medium are associated with each other; when the sensor has detected that the particular operation is performed for a first tray as one of the at least one tray, displaying, on the display device, a tray-setting screen for accepting an input for a setting item for the recording medium to be placed on the first tray; when first-tray information relating to the first tray is registered in the registered at least one piece of tray relating information, displaying, on the display device, the tray-setting screen containing a related-setting-item object indicating a setting item for the recording medium which is associated with the first tray in the first-tray information; and when the related-setting-item object is selected via the input interface in a state in which the tray-setting screen is displayed, setting the recording medium corresponding to the related-setting-item object, to a placing medium that is the recording medium to be placed on the first tray.

In yet another aspect of the disclosure, a non-transitory storage medium stores a plurality of instructions executable by a processor of an image processing apparatus. The image processing apparatus includes (i) at least one tray configured to support a recording medium, (ii) a sensor provided for each of the at least one tray and configured to sense that a particular operation is performed for a corresponding one of the at least one tray, (iii) a display device, and (iv) an input interface. The plurality of instructions, when executed, cause the image processing apparatus to: register at least one piece of tray relating information in which one of the at least one tray and a setting item for specifying the recording medium are associated with each other; when the sensor has detected that the particular operation is performed for a first tray as one of the at least one tray, control the display device to display a tray-setting screen for accepting an input for a setting item for the recording medium to be placed on the first tray; when first-tray information relating to the first tray is registered in the registered at least one piece of tray relating information, control the display device to display the tray-setting screen containing a related-setting-item object indicating a setting item for the recording medium which is associated with the first tray in the first-tray information; and when the related-setting-item object is selected via the input interface in a state in which the tray-setting screen is displayed, set the recording medium corresponding to the related-setting-item object, to a placing medium that is the recording medium to be placed on the first tray.

BRIEF DESCRIPTION OF THE DRAWINGS

The objects, features, advantages, and technical and industrial significance of the present disclosure will be better understood by reading the following detailed description of the embodiment, when considered in connection with the accompanying drawings, in which.

EMBODIMENT

Hereinafter, there will be described one embodiment by reference to the drawings.

1. Configuration of Image Processing Apparatus

Figure 1:
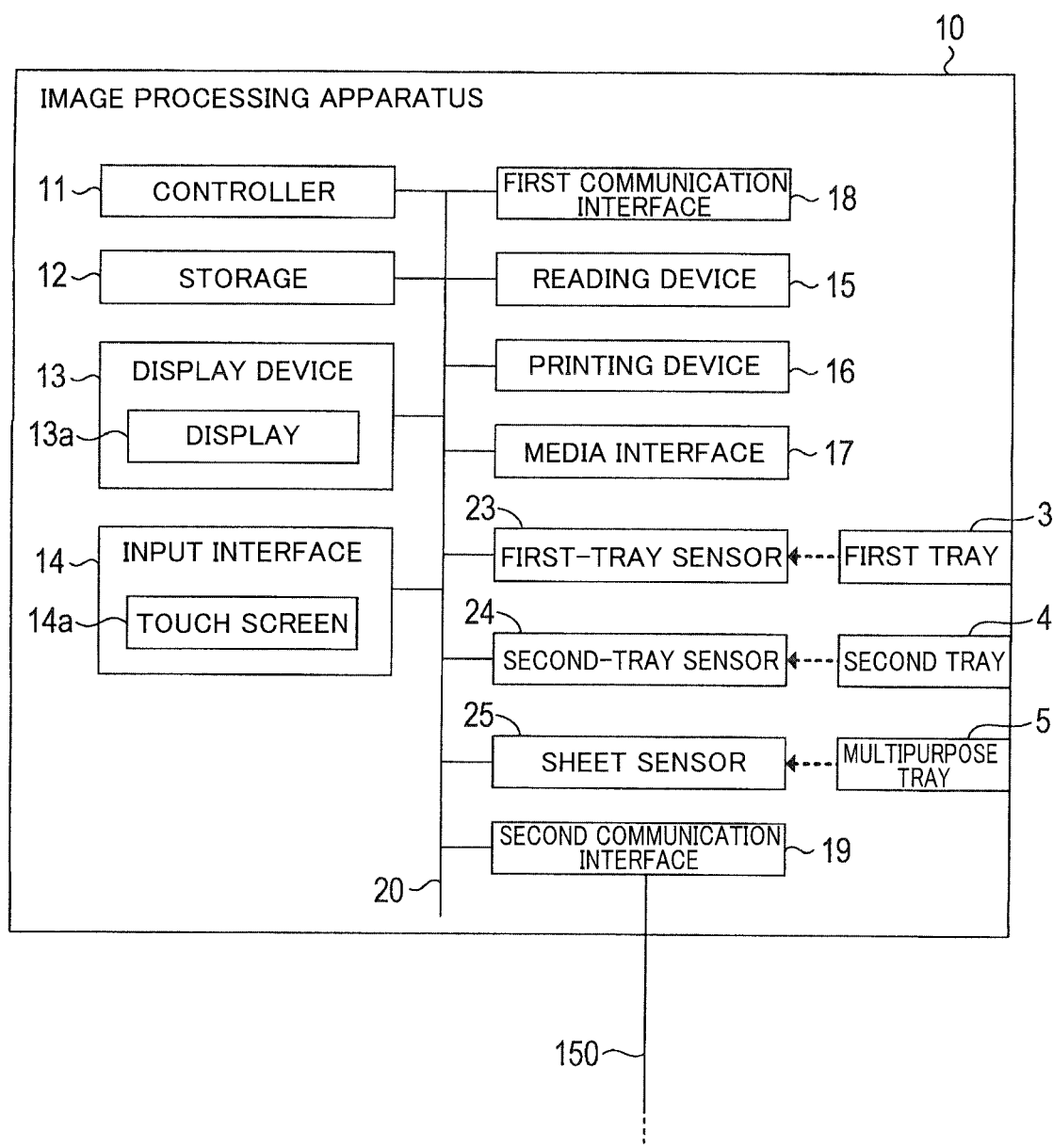
FIG. 1 is a block diagram of a configuration of an image processing apparatus according to one embodiment.

An image processing apparatus 10 according to the present embodiment in FIG. 1 has a plurality of functions including a scanning function, a printing function, a copying function, and a facsimile function, for example. The scanning function is a function for reading an image formed on a document to create image data based on the read image. The printing function is a function for printing an image on a recording sheet. The copying function is a function using the printing function to print an image read in the scanning function. The facsimile function is a function for transmitting and receiving facsimile data.

As illustrated in FIG. 1, the image processing apparatus 10 includes a controller 11, a storage 12, a display device 13, an input interface 14, a reading device 15, a printing device 16, a media interface 17, a first communication interface 18, a second communication interface 19, a first-tray sensor 23, a second-tray sensor 24, and a sheet sensor 25 which are connected to each other via a bus 20.

The image processing apparatus 10 includes a first tray 3, a second tray 4, and a multipurpose tray 5. The first tray 3, the second tray 4, and the multipurpose tray 5 are mountable on and removable from a housing, not illustrated, of the image processing apparatus 10.

The first tray 3, the second tray 4, and the multipurpose tray 5 are capable of supporting at least one recording sheet. Each of the first tray 3, the second tray 4, and the multipurpose tray 5 is capable of supporting the recording sheet of at least one sheet size and at least one sheet type.

Examples of the sheet size of the recording sheet placeable on the first tray 3 include the A4 size, the A3 size, the B5 size, the US letter size, the L size, the 2L size, the postcard size, and the envelope size. The recording sheets of sizes similar to those described above are placeable on each of the second tray 4 and the multipurpose tray 5. It is noted that the sheet sizes of the placeable recording sheets may be different among the trays.

Examples of the sheet type of the recording sheet placeable on the first tray 3 include plain paper, ink-jet paper, paper only for a vendor, and glossy paper. The recording sheets of types similar to those described above are placeable on each of the second tray 4 and the multipurpose tray 5. It is noted that the sheet types of the placeable recording sheets may be different among the trays.

Each of the first tray 3 and the second tray 4 is shaped substantially like a box, for example. It is assumed that each of the first tray 3 and the second tray 4 is to be mounted in a state in which the recording sheets are placed on the tray by the user. The multipurpose tray 5 is shaped like a plate, for example. It is assumed that the user generally places his or her desired recording sheets on the multipurpose tray 5 for printing.

The first-tray sensor 23 senses whether the first tray 3 has been mounted to the image processing apparatus 10. Specifically, when the first tray 3 is mounted to the image processing apparatus 10, the first-tray sensor 23 outputs a first-tray mounted signal to the bus 20, and when the first tray 3 is removed from the image processing apparatus 10, the first-tray sensor 23 outputs a first-tray removed signal to the bus 20.

The second-tray sensor 24 senses whether the second tray 4 has been mounted to the image processing apparatus 10. Specifically, when the second tray 4 is mounted to the image processing apparatus 10, the second-tray sensor 24 outputs a second-tray mounted signal to the bus 20, and when the second tray 4 is removed from the image processing apparatus 10, the second-tray sensor 24 outputs a second-tray removed signal to the bus 20.

The sheet sensor 25 senses whether at least one recording sheet is set (i.e., placed) on the multipurpose tray 5. Specifically, when at least one recording sheet is set on the multipurpose tray 5, the sheet sensor 25 outputs a sheet set signal to the bus 20.

The controller 11 is capable of obtaining the first-tray mounted signal, the first-tray removed signal, the second-tray mounted signal, the second-tray removed signal, and the sheet set signal via the bus 20. The controller 11 includes a central processing unit (CPU), for example. The storage 12 includes semiconductor memories including a read-only memory (ROM), a random-access memory (RAM), a non-volatile random access memory (NVRAM), and a flash memory, for example. That is, the image processing apparatus 10 according to the present embodiment includes a microcomputer including the CPU and the semiconductor memories.

The controller 11 performs various functions by executing programs stored in a non-transitory storage medium. In the present embodiment, the storage 12 is one example of the non-transitory storage medium storing the programs. It is noted that the various functions to be performed by the controller 11 are not limited to those performed by execution of the programs (i.e., a software processing), and some or all of the functions may be performed using one or more hardware devices.

The storage 12 stores data relating to various screens including screens illustrated in FIGS. 2-6. The storage 12 further stores programs for a tray setting process illustrated in FIGS. 7-9, for example.

The display device 13 in the present embodiment includes a display 13a for displaying various kinds of information. The input interface 14 includes an input device for accepting various input operations. In the present embodiment, the input interface 14 includes a touch screen 14a as the input device. The touch screen 14a is superposed on an image display region of the display 13a. The image display region is a region on which an image is to be displayed.

The touch screen 14a superposed on the image display region of the display 13a is configured to detect an instructing operation that is a touch or an approach of an input object on or to the image display region. That is, in the case where a user is performing the instructing operation with the input object relative to the image display region, the touch screen 14a can output positional information representing an instructed position at which the user is performing the instructing operation. In the present embodiment, the touch screen 14a is configured to continuously or periodically output the positional information while the instructing operation is being performed with the input object.

It is noted that the touch screen 14a may be configured to detect any of only a touch of the input object, only an approach of the input object, and both of a touch and an approach of the input object as the instructing operation.

The controller 11 is configured to obtain the positional information output from the touch screen 14a and based on the obtained positional information detect (i) the presence or absence of the instructing operation with the input object, (ii) the instructed position in the case where the user is performing the instructing operation, and (iii) at least one type of a specific operation with the input object in the case where the user is performing the instructing operation.

Examples of the specific operation detectable by the controller 11 include a tap, a flick, and a drag. The tap is an operation in which, after the instructing operation is performed with the input object, the input object moves off or away from the touch screen 14a at the same position. Examples of the input object to be used for the instructing operation include a fingertip and a particular instructing device such as a stylus.

The reading device 15 includes an image sensor and is configured to read an image formed on a document to create image data based on the read image. Hereinafter, the read image and the image data based on the read image may be hereinafter referred to as "scanned image" and "scanned data", respectively.

The printing device 16 includes an ink-jet or electrophotographic printing mechanism and is capable of printing an image on the recording sheet. The printing mechanism takes out one recording sheet from any one of the trays and prints an image on the recording sheet by ejecting or transferring a coloring agent onto or to the recording sheet while conveying the recording sheet.

In the present embodiment, the sheet size and the sheet type of the recording sheet to be placed are settable for each of the first tray 3, the second tray 4, and the multipurpose tray 5. Hereinafter, the sheet size and the sheet type set for each tray may be referred to as "tray-setting information". When controlling the printing device 16 to print an image, the controller 11 refers to the tray-setting information set for each tray as needed, allowing the printing device 16 to print an image of high quality.

For example, when performing the copying function, the controller 11 allows the user to select a tray to be used. That is, the user can select which tray is to be used for image printing on the recording sheet in the copying function. When the tray to be used is selected, the controller 11 controls the printing device 16 based on the tray-setting information set for the selected tray, allowing the printing device 16 to print an image of appropriate quality.

The user may set the tray to be used, to a particular tray, and may set the tray to be used, such that the image processing apparatus 10 automatically select the tray to be used. When the tray to be used is set to be automatically selected, the controller 11 automatically selects the tray supporting the recording sheet appropriate for printing, by comparing the tray-setting information for each tray with image properties such as the size and the orientation of the image to be printed, for example. The controller 11 then controls the printing device 16 to print the image on the recording sheet supplied from the selected tray.

The controller 11 allows the user to select one of a plurality of options for each of the sheet size and the sheet type of the recording sheet for image printing in the copying function. In the case where the tray to be used is set at the particular tray in this selection, the controller 11 controls the display device 13 to display the options for the sheet size and the sheet type by narrowing the options as needed based on the tray-setting information for the set tray to be used.

The media interface 17, for example, is an interface on which at least one of various storage media such as a USB flash memory is to be mounted. The media interface 17 controls writing and reading of data into or from the mounted storage medium.

The first communication interface 18 is a communication interface for connecting the image processing apparatus 10 to a network, not illustrated. Examples of the network include a wired local-area network (LAN), a wireless LAN, and any of other wireless communication networks. The image processing apparatus 10 is capable of performing data communication via the first communication interface 18 with various information processing devices including a personal computer (PC), a smartphone, and a tablet computer. The image processing apparatus 10 is connectable to the Internet via the first communication interface 18 to perform data communication over the Internet with other various servers and/or various information processing devices, for example.

The second communication interface 19 is an interface for communicating with an external device over a communication network 150. The communication network 150 connected to the second communication interface 19 is a public telephone network in the present embodiment, for example. Transmission and reception of facsimile data in the facsimile function are principally performed via the second communication interface 19.

2. Tray-Setting Screen and Example of Screen Transition Starting from Tray-Setting Screen When a power source of the image processing apparatus 10 is turned on, and the controller 11 is activated, the controller 11 controls the display device 13 to display a standby screen 40 illustrated in FIG. 2. The standby screen 40 functions as an initial screen when the user uses the image processing apparatus 10 to perform various functions.

The standby screen 40 contains a plurality of function buttons each for performing a corresponding one of the functions. The standby screen 40 illustrated in FIG. 2 contains a Fax button 41, a Copy button 42, and a Scan button 43 as the plurality of function buttons by way of example. When the Fax button 41 is selected, the controller 11 performs the facsimile function. When the Copy button 42 is selected, the controller 11 performs the copying function. When the Scan button 43 is selected, the controller 11 performs the scanning function. The selecting operation may be any operation. In the present embodiment, the selecting operation is the tap, for example.

When a particular operation is performed for any one of the first tray 3, the second tray 4, and the multipurpose tray 5 in the state in which the standby screen 40 is displayed, the display device 13 displays a tray-setting screen corresponding to the tray for which the particular operation is performed. The particular operation may be any operation. Examples of the particular operation include: an operation of mounting the tray; an operation of removing the tray from the image processing apparatus 10; an operation of setting (i.e., placing) the recording sheet to the tray.

In the present embodiment, one example of the particular operation for each of the first tray 3 and the second tray 4 is the operation of removing the tray from the image processing apparatus 10, and one example of the particular operation for the multipurpose tray 5 is the operation of setting the recording sheet to the multipurpose tray 5.

The controller 11 is capable of detecting the particular operation performed for the first tray 3, in response to an output of the first-tray removed signal from the first-tray sensor 23. The controller 11 is capable of detecting the particular operation performed for the second tray 4, in response to an output of the second-tray removed signal from the second-tray sensor 24. The controller 11 is capable of detecting the particular operation performed for the multipurpose tray 5, in response to an output of the sheet set signal from the sheet sensor 25. Hereinafter, the tray for which the controller 11 has detected that the particular operation is performed will be hereinafter referred to as "sensed tray".

Figure 2:
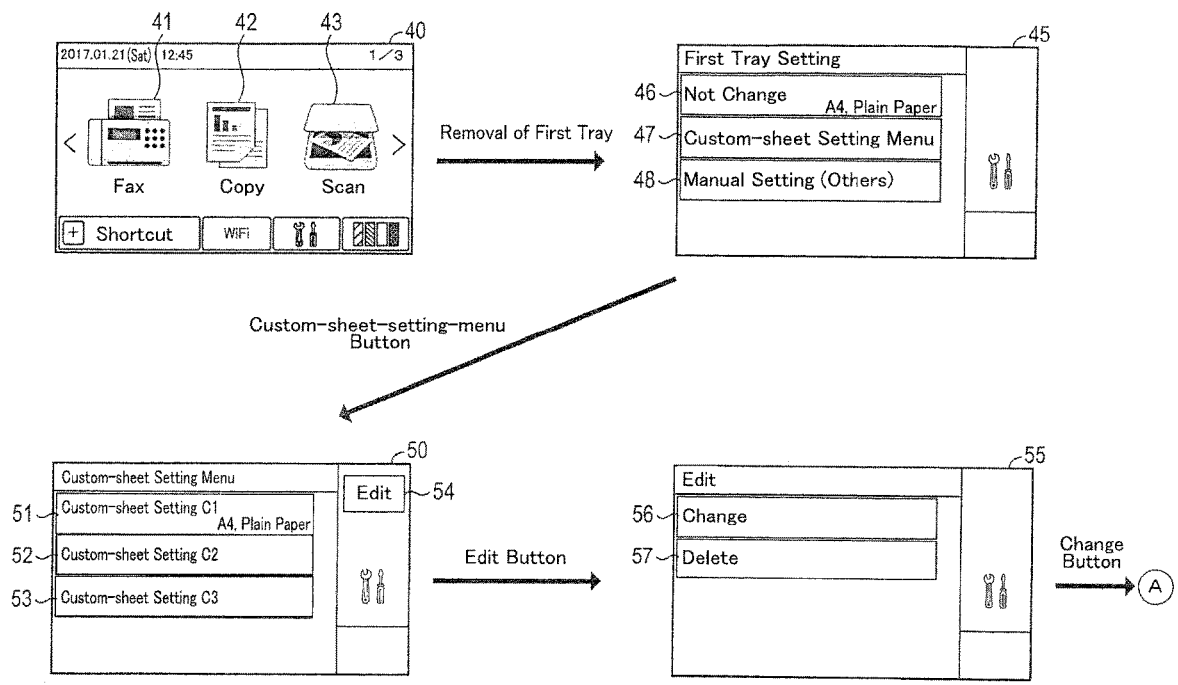
FIG. 2 is a view for explaining a portion of an example of screen transition starting from a tray-setting screen.
Figure 3:
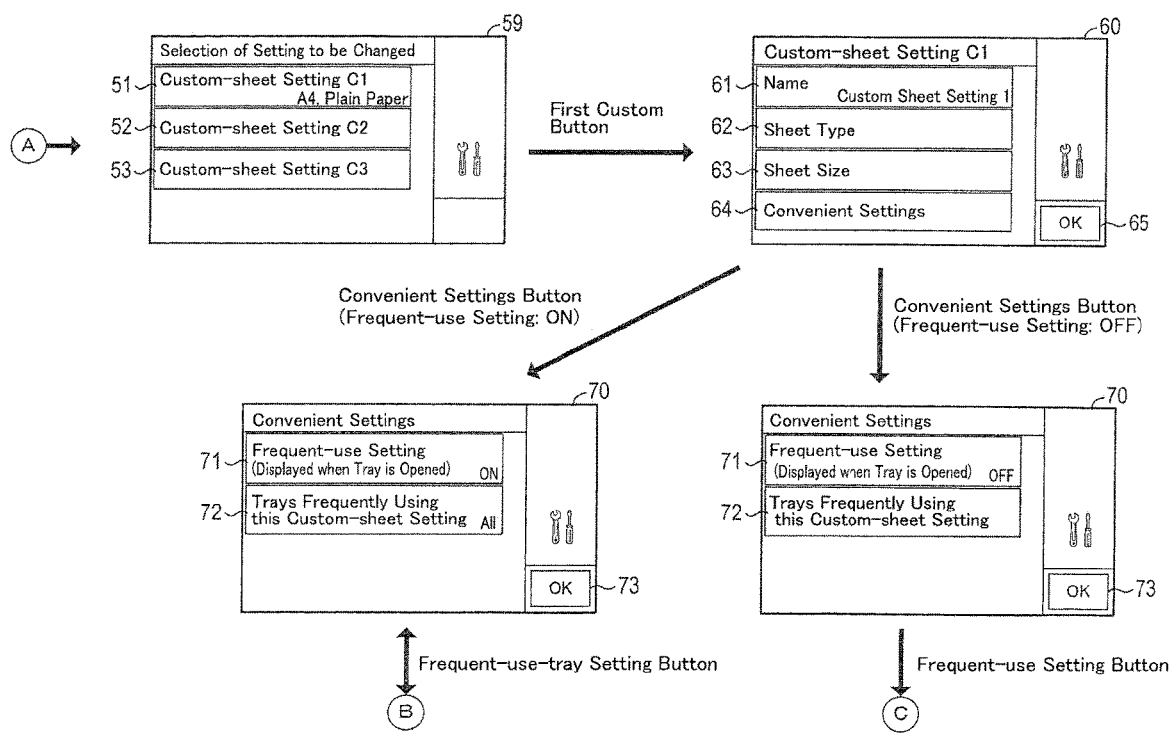
FIG. 3 is a view for explaining another portion of the example of the screen transition starting from the tray-setting screen (continued from FIG. 2)
Figure 4:
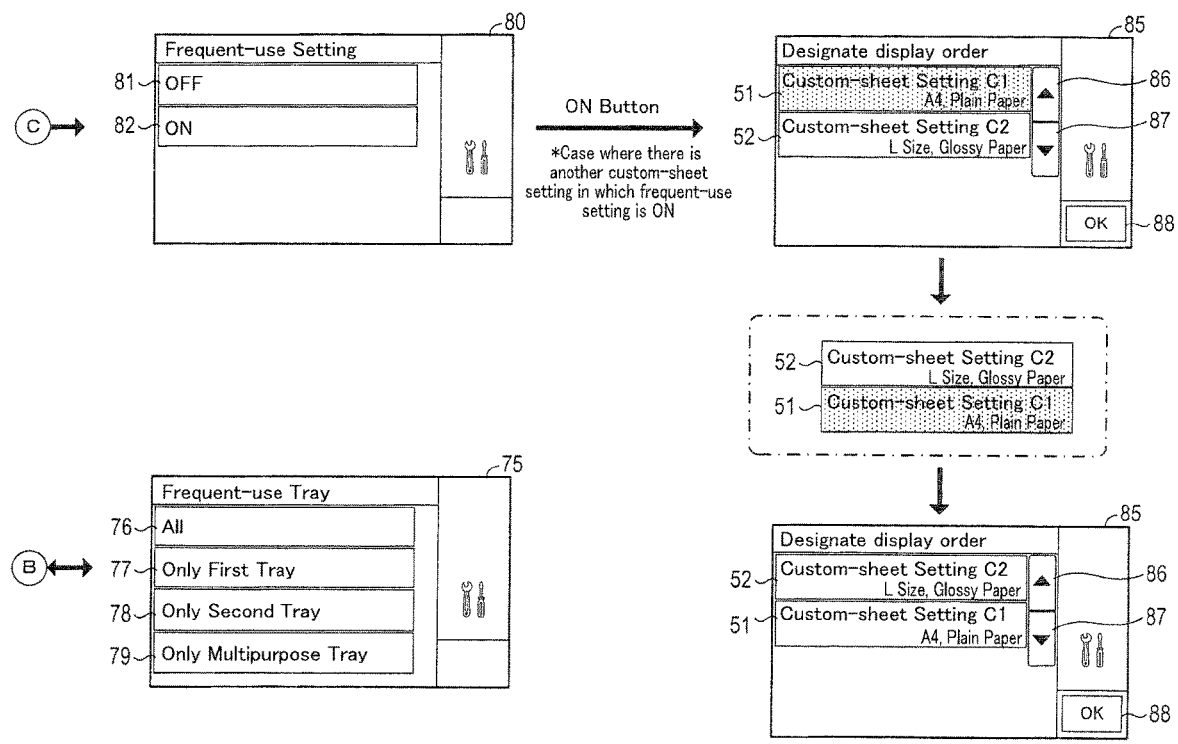
FIG. 4 is a view for explaining yet another portion of the example of the screen transition starting from the tray-setting screen (continued from FIG. 3)

FIGS. 2-4 illustrate an example of screen transition in the case where the particular operation is performed for the first tray 3, by way of example. When the particular operation is performed for the first tray 3 in the state in which the standby screen 40 is displayed, the display device 13 displays a tray-setting screen 45 illustrated in FIG. 2.

The tray-setting screen 45 is a screen for accepting setting of the tray-setting information for the recording sheet placed on the sensed tray. The tray-setting screen 45 contains a Not Change button 46, a custom-menu button 47, and a Manual Setting button 48.

The displayed Not Change button 46 contains the tray-setting information set for the sensed tray at present. The Not Change button 46 in FIG. 2 indicates that the tray-setting information representing that the sheet size is "A4", and the sheet type is "plain paper" is set for the sensed tray at present, for example. When the Not Change button 46 is selected, the tray-setting information set for the sensed tray at present is kept, and the screen displayed on the display device 13 is switched to the standby screen 40.

When the Manual Setting button 48 is selected, the display device 13 displays a setting-value selecting screen, not illustrated. The user is allowed to select the sheet type and the sheet size on the setting-value selecting screen. The sheet type and the sheet size selected on the setting-value selecting screen are set for new tray-setting information for the sensed tray, and the screen displayed on the display device 13 is switched to the standby screen 40.

When the custom-menu button 47 is selected, the display device 13 displays a custom-menu screen 50 illustrated in FIG. 2. The custom-menu screen 50 contains a plurality of custom buttons. The custom-menu screen 50 in the present embodiment contains a first custom button 51, a second custom button 52, and a third custom button 53.

In the present embodiment, the user is allowed to register a combination of one particular sheet type and one particular sheet size selected as desired, as a custom sheet setting. In the present embodiment, the user is allowed to register three types of custom sheet settings, namely, custom sheet settings C1, C2, C3, for example. By registering a combination frequently used, as the custom sheet setting in advance, the user can easily set the registered custom sheet setting, to the tray-setting information, for example.

On the custom-menu screen 50, the custom sheet setting C1 is associated with the first custom button 51, the custom sheet setting C2 is associated with the second custom button 52, and the custom sheet setting C3 is associated with the third custom button 53.

In the case where the corresponding custom sheet setting has not been registered with any one or ones of the custom buttons 51-53, the button or buttons are grayed out and cannot be selected. On the custom-menu screen 50 illustrated in FIG. 2, for example, the second custom button 52 and the third custom button 53 are grayed out because their respectively corresponding custom sheet settings C2, C3 are unregistered. The custom sheet setting C1 has already been registered. In this case, the displayed corresponding first custom button 51 contains the registered contents of the custom sheet setting C1, i.e., combination information indicating the combination of the sheet type and the sheet size. In the example illustrated in FIG. 2, the sheet size "A4" and the sheet type "plain paper" are registered as the custom sheet setting C1.

The user is allowed to set the registered custom sheet setting as the tray-setting information for the sensed tray. That is, when any one of the custom buttons is selected on the custom-menu screen 50, the custom sheet setting corresponding to the selected custom button is set as the tray-setting information for the sensed tray, and the screen displayed on the display device 13 is switched to the standby screen 40.

The custom-menu screen 50 contains an Edit button 54. When the Edit button 54 is selected, the display device 13 displays an edit-menu screen 55 illustrated in FIG. 2. The edit-menu screen 55 contains a Change button 56 and a Delete button 57. The user can select the Delete button 57 to delete the registration of the registered custom sheet setting.

When the Change button 56 is selected on the edit-menu screen 55, the display device 13 displays a change-setting selecting screen 59 illustrated in FIG. 3. The user can change the registered contents of any one of the custom sheet settings C1-C3, with the change-setting selecting screen 59 functioning as an initial screen.

As on the custom-menu screen 50 (see FIG. 2), the change-setting selecting screen 59 contains the custom buttons 51-53 corresponding to the respective custom sheet settings C1-C3. This allows the user to select a button corresponding to the custom sheet setting having the registered contents the user wants to change among the custom buttons 51-53, whereby the user can change the registered contents of the custom sheet setting.

When the first custom button 51 is selected on the change-setting selecting screen 59, for example, the display device 13 displays a custom-setting screen 60 illustrated in FIG. 3. The custom-setting screen 60 contains a Name button 61, a Sheet Type button 62, a Sheet Size button 63, a Convenient Settings button 64, and an OK button 65.

The Name button 61 contains the present name of the custom sheet setting C1. When the Name button 61 is selected, a name accepting processing for accepting user's input of the name of the custom sheet setting C1 is executed to set the name of the custom sheet setting C1. After the completion of the name accepting processing, the set name is displayed on the Name button 61 on the custom-setting screen 60, and the set name is also displayed on the first custom button 51 of each of the custom-menu screen 50 and the change-setting selecting screen 59.

When the Sheet Type button 62 is selected, a sheet-type accepting processing for accepting user's input for setting the sheet type of the custom sheet setting C1 is executed to set the sheet type of the custom sheet setting C1.

When the Sheet Size button 63 is selected, a sheet-size accepting processing for accepting user's input for setting the sheet size of the custom sheet setting C1 is executed to set the sheet size of the custom sheet setting C1.

When the OK button 65 is selected, the combination of the sheet type and the sheet size of the custom sheet setting C1 set at present is registered as the custom sheet setting C1, and the screen of the display device 13 is switched to the change-setting selecting screen 59.

When the Convenient Settings button 64 is selected on the custom-setting screen 60, the display device 13 displays a convenient-setting screen 70 illustrated in FIG. 3. With the convenient-setting screen 70 functioning as an initial screen, the user is allowed to register the custom sheet setting to be changed, as a frequent-use setting, so as to associate the custom sheet setting with a desired tray. In the example illustrated in FIG. 3, since the custom sheet setting to be changed is the custom sheet setting C1, it is possible to register the custom sheet setting as the frequent-use setting so as to associate the custom sheet setting C1 with a desired tray. When the frequent-use setting is registered, a frequent-use-setting-value button 49 (see FIGS. 5 and 6) is displayed on the tray-setting screen 45 displayed when the particular operation is performed for the tray corresponding to the registered frequent-use setting. The user can select the frequent-use-setting-value button 49 to set the tray-setting information for the sensed tray, to the sheet type and the sheet size in the frequent-use setting corresponding to the frequent-use-setting-value button 49.

As illustrated in FIG. 3, the convenient-setting screen 70 contains a Frequent-use Setting button 71, a frequent-use-tray setting button 72, and an OK button 73. The Frequent-use Setting button 71 is a button for registering the custom sheet setting to be changed, as the frequent-use setting, or deleting the registration of the custom sheet setting as the frequent-use setting. In the case where the custom sheet setting to be changed is not registered as the frequent-use setting, as illustrated in the lower right portion in FIG. 3, the frequent-use-tray setting button 72 is grayed out, and selection thereof cannot be accepted. In the case where the custom sheet setting to be changed has already been registered as the frequent-use setting, as illustrated in the lower left portion in FIG. 3, the frequent-use-tray setting button 72 is not grayed out, and selection thereof can be accepted.

When the frequent-use-tray setting button 72 is selected on the convenient-setting screen 70, the display device 13 displays a frequent-use-tray selecting screen 75 illustrated in FIG. 4. The frequent-use-tray selecting screen 75 contains an all-tray button 76, a first-tray button 77, a second-tray button 78, and a multipurpose-tray button 79. The user can select any button to select a frequent-use tray to be associated with the custom sheet setting to be changed. For example, when the first-tray button 77 is selected, the first tray 3 is set as the frequent-use tray, and the frequent-use setting in which the custom sheet setting to be changed and the first tray 3 are associated with each other is registered. For example, when the all-tray button 76 is selected, each of all the trays 3, 4, 5 is set as the frequent-use tray, and three frequent-use settings in each of which the custom sheet setting to be changed and a corresponding one of the trays 3, 4, 5 are associated with each other are registered.

When the Frequent-use Setting button 71 is selected on the convenient-setting screen 70, the display device 13 displays a frequent-use-setting screen 80 illustrated in FIG. 4. The frequent-use-setting screen 80 contains an OFF button 81 and an ON button 82. When the OFF button 81 is selected, the frequent-use setting is set to OFF, and the registration thereof is deleted. When the ON button 82 is selected, the frequent-use setting is set to ON, and registration of the frequent-use setting is permitted. That is, by setting the frequent-use tray on the frequent-use-tray selecting screen 75 as described above, it is possible to register the frequent-use setting in which the frequent-use tray and the custom sheet setting are associated with each other.

It is noted that, in the case where a custom sheet setting different from the custom sheet setting to be changed has already been registered as the frequent-use setting before the ON button 82 is selected, when the ON button 82 is selected, a display-order setting screen 85 illustrated in FIG. 4 is displayed in addition to registering the custom sheet setting to be changed, as the frequent-use setting.

Figure 5:
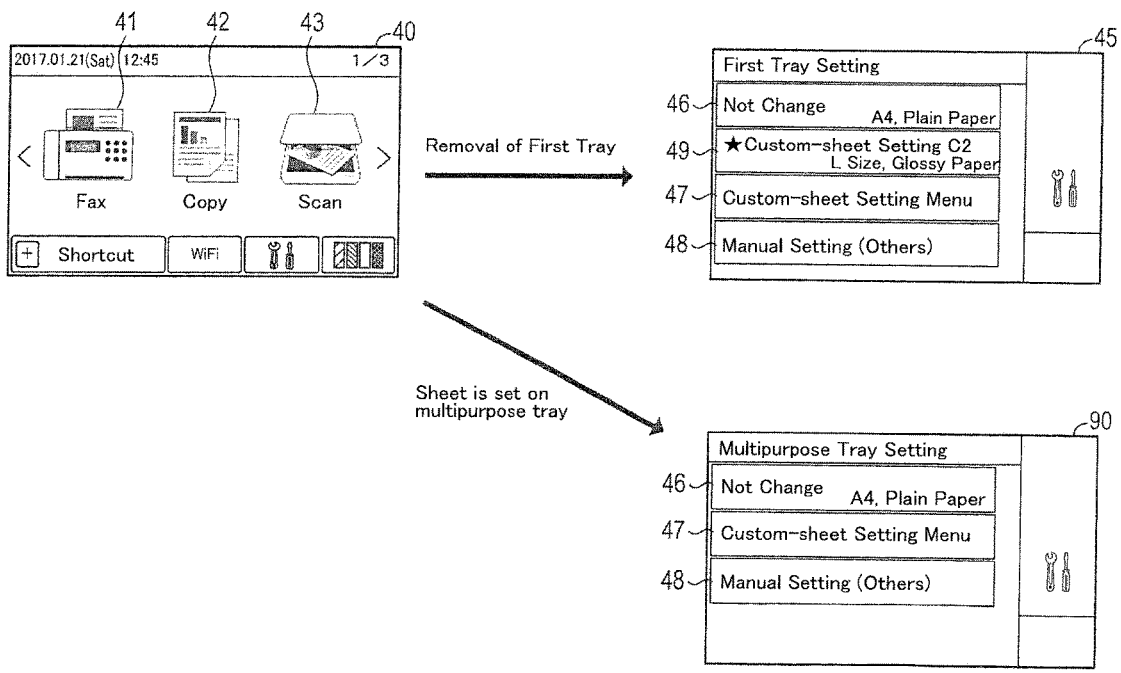
FIG. 5 is a view for explaining an example of a tray-setting screen in a setting pattern 1.
Figure 6:
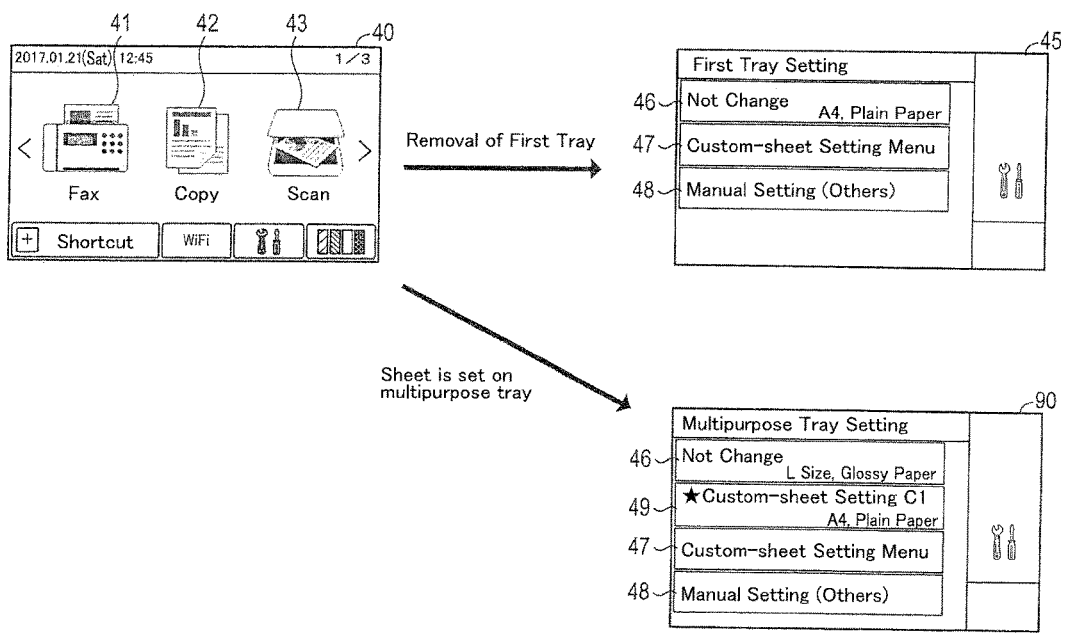
FIG. 6 is a view for explaining an example of a tray-setting screen in a setting pattern 2.
Figure 7:
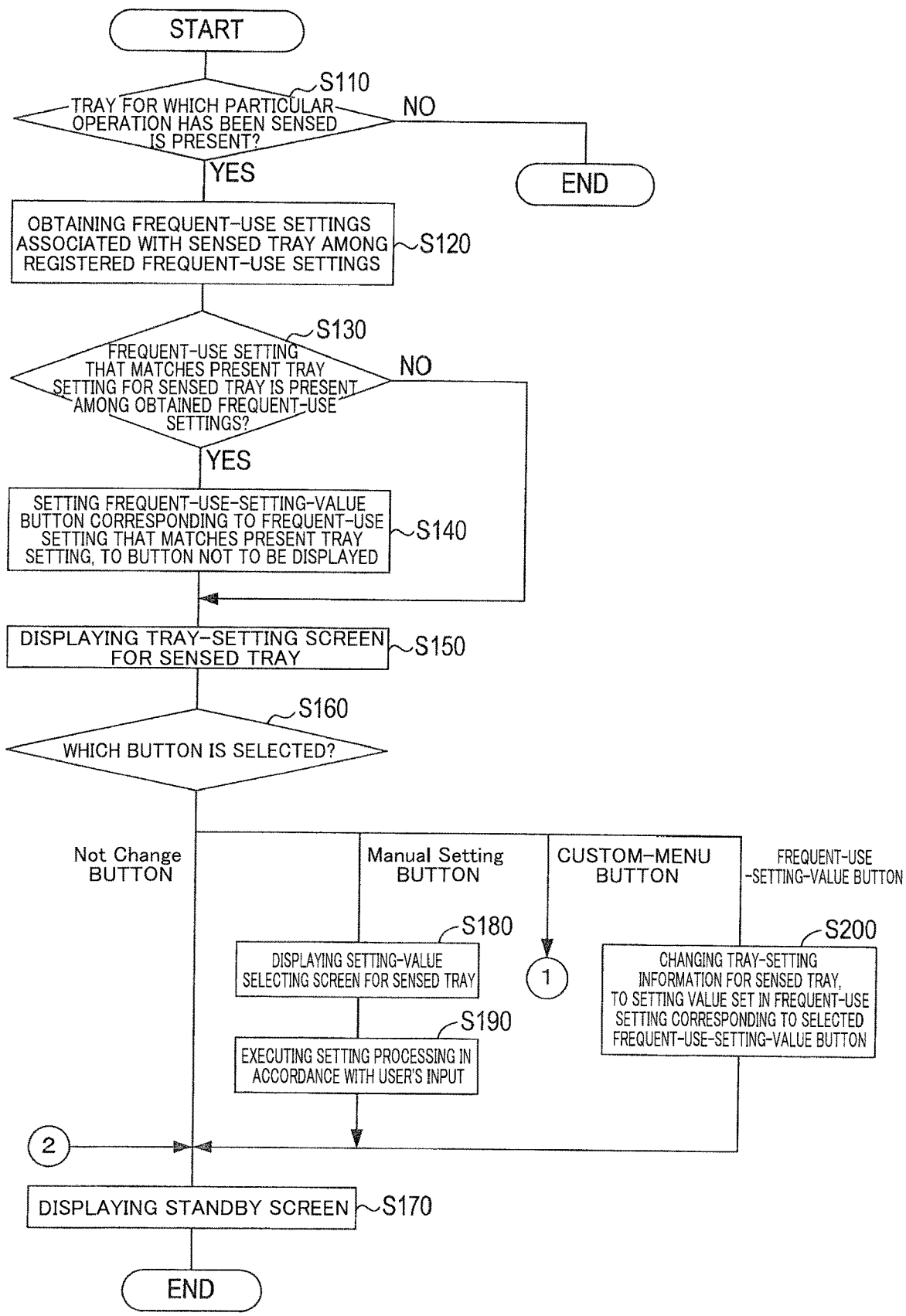
FIG. 7 is a flowchart representing a portion of a tray setting process.

The display-order setting screen 85 is a screen for, in the case where a plurality of custom sheet settings are registered as the frequent-use settings, setting the display order of the frequent-use-setting-value buttons 49 corresponding respectively to the frequent-use settings on the tray-setting screen 45 (see FIGS. 2, 5, and 6). The display-order setting screen 85 contains: the custom buttons corresponding to the respective custom sheet settings registered as the frequent-use settings; an up button 86; a down button 87; and an OK button 88.

The user can select the up button 86 or the down button 87 on the display-order setting screen 85 to change the display order. In the example in FIG. 4, for example, when the first custom button 51 of the two custom buttons 51, 52 is selected, the selected custom button 51 is set to be a button for which the ordinal number is to be changed. As illustrated in FIG. 4, the custom button set to be the button for which the ordinal number is to be changed is displayed in a display manner different from that of the other button.

When the down button 87 is selected in the state in which the first custom button 51 is set to be the button for which the ordinal number is to be changed, as illustrated in FIG. 4, the first custom button 51 moves down by one level, and instead the second custom button 52 located one level lower than the first custom button 51 before the movement moves to the position above the first custom button 51. It is noted that when the up button 86 is selected in this state, the first custom button 51 moves by one level to the position above the second custom button 52. When the OK button 88 is selected, the positional relationship between the custom buttons displayed on the display-order setting screen 85 at the time is determined as the display order of the frequent-use-setting-value buttons 49 for their respectively corresponding frequent-use settings on the tray-setting screen 45.

There will be next described, with reference to FIGS. 5 and 6, one example of the tray-setting screen 45 to be displayed in the case where the frequent-use setting is registered. Here, the setting pattern 1 and the setting pattern 2 are assumed.

The setting pattern 1 is an example of a setting in which the sheet type "glossy paper" and the sheet size "L size" are registered as the custom sheet setting C2, and the custom sheet setting C2 is registered as the frequent-use setting so as to be associated with the first tray 3 (that is, the first tray 3 serves as the frequent-use tray). In the setting pattern 1, the custom sheet settings C1, C3 are unregistered.

The setting pattern 2 is an example of a setting in which the sheet type "plain paper" and the sheet size "A4" are set as the custom sheet setting C1, and the custom sheet setting C1 is registered as the frequent-use setting so as to be associated with each of all the trays 3-5. In the setting pattern 2, the custom sheet settings C2, C3 are unregistered.

In the setting pattern 1, for example, when the first tray 3 is removed from the image processing apparatus 10, as illustrated in FIG. 5, the display device 13 displays the tray-setting screen 45 for the first tray 3. As on the tray-setting screen 45 illustrated in FIG. 2, this tray-setting screen 45 contains the Not Change button 46, the custom-menu button 47, and the Manual Setting button 48. In addition, in the case where the custom sheet setting C2 is registered as the frequent-use setting so as to be associated with the first tray 3, the frequent-use-setting-value button 49 indicating the frequent-use setting is displayed on the tray-setting screen 45.

The displayed frequent-use-setting-value button 49 contains: the name of the custom sheet setting C2 registered as the frequent-use setting; and setting information on the custom sheet setting C2 (i.e., the combination of the sheet type and the sheet size). The user can select the frequent-use-setting-value button 49 to set the custom sheet setting C2 as the tray-setting information for the first tray 3.

In the case where two or more frequent-use settings in each of which the first tray 3 is set as the frequent-use tray are registered, two frequent-use-setting-value buttons corresponding respectively to the two frequent-use settings are displayed in the display order set on the display-order setting screen 85 (see FIG. 4).

In the setting pattern 1, for example, when the recording sheet or sheets are set on the multipurpose tray 5, as illustrated in FIG. 5, the display device 13 displays the tray-setting screen 90 for the multipurpose tray 5. As on the tray-setting screen 45 illustrated in FIG. 2, this tray-setting screen 90 contains the Not Change button 46, the custom-menu button 47, and the Manual Setting button 48. Since the frequent-use setting in which the multipurpose tray 5 is set as the frequent-use tray is unregistered, the frequent-use-setting-value button is not displayed.

In the setting pattern 2, for example, when the first tray 3 is removed from the image processing apparatus 10, as illustrated in FIG. 6, the display device 13 displays the tray-setting screen 45 for the first tray 3. In the setting pattern 2, the custom sheet setting C1 is registered as the frequent-use setting so as to be associated with all the trays including the first tray 3. It is noted that the sheet type "plain paper" and the sheet size "A4" of the custom sheet setting C1 registered as the frequent-use setting respectively match the sheet type and the sheet size set at present as the tray-setting information for the first tray 3. Thus, the frequent-use-setting-value button corresponding to the custom sheet setting C1 is not displayed. Also in this case, however, the frequent-use-setting-value button corresponding to the custom sheet setting C1 may be displayed.

In the setting pattern 2, for example, when the recording sheet or sheets are set on the multipurpose tray 5, as illustrated in FIG. 6, the display device 13 displays the tray-setting screen 90 for the multipurpose tray 5. In this case, in the case where the custom sheet setting C1 is registered as the frequent-use setting so as to be associated with the multipurpose tray 5, the frequent-use-setting-value button 49 indicating the frequent-use setting is displayed on the tray-setting screen 90. The user can select the frequent-use-setting-value button 49 to set the custom sheet setting C1 as the tray-setting information for the multipurpose tray 5.

It is noted that each of the custom sheet settings C1-C3 is a setting value representing a combination of a particular sheet type and a particular sheet size which is not related to the tray. Thus, when the custom-menu button 47 is selected on the tray-setting screen 90 displayed in response to the particular operation performed on the multipurpose tray 5, the custom-menu screen 50 illustrated in FIG. 2 is displayed. The processings and the screen transition after the display of the custom-menu screen 50 are also the same as those in the case where the particular operation is performed for the first tray 3. The same processings and screen transition are similarly performed in the case where the custom-menu button 47 is selected on the tray-setting screen in the case where the particular operation is performed for the second tray 4.

3. Tray Setting Process

There will be next described the tray setting process to be executed by the controller 11. The controller 11 repeats the tray setting process illustrated in FIGS. 7-9 at intervals of a particular controlling period while the standby screen 40 is being displayed on the display device 13. The controller 11 reads programs for the tray setting process stored in the storage 12 and executes the tray setting process according to the programs. The example of the screen transition illustrated in FIGS. 2-6 is achieved by the controller 11 executing the tray setting process.

The tray setting process begins with S110 at which the controller 11 determines whether the tray for which the particular operation has been sensed is present. When the tray for which the particular operation has been sensed is absent, the tray setting process ends. When the tray for which the particular operation has been sensed is present, this flow goes to S120.

The controller 11 at S120 obtains the frequent-use settings associated with the sensed tray. The controller 11 at S130 determines whether the frequent-use setting that matches the tray setting set at present as the tray-setting information for the sensed tray is present among the obtained frequent-use settings. When the frequent-use setting that matches the present tray setting is absent, this flow goes to S150. When the frequent-use setting that matches the present tray setting is present, this flow goes to S140. The controller 11 at S140 sets a frequent-use-setting-value button corresponding to the frequent-use setting that matches the present tray setting, to a button not to be displayed on the tray-setting screen.

The controller 11 at S150 controls the display device 13 to display the tray-setting screen for the sensed tray. In this state, the display device 13 does not display the frequent-use-setting-value button set at S140 so as not to be displayed. It should be noted that the frequent-use setting corresponding to the frequent-use-setting-value button set so as not to be displayed is displayed on the Not Change button 46 on the tray-setting screen.

The controller 11 at S160 determines which button is selected on the tray-setting screen. When the Not Change button 46 is selected on the tray-setting screen, the controller 11 keeps the present tray setting for the sensed tray, and this flow goes to S170. The controller 11 at S170 displays the standby screen 40 on the display device 13, and the tray setting process ends.

When the controller 11 determines at S160 that the Manual Setting button 48 is selected on the tray-setting screen, this flow goes to S180. The controller 11 at S180 controls the display device 13 to display the setting-value selecting screen corresponding to the sensed tray. The controller 11 at S190 sets the sheet type and the sheet size of the sensed tray in accordance with an input operation performed on the setting-value selecting screen with the input interface 14. The controller 11 sets the set sheet type and sheet size as the new tray-setting information for the sensed tray, and this flow goes to S170.

When the controller 11 determines at S160 that the frequent-use-setting-value button 49 is selected on the tray-setting screen, this flow goes to S200. The controller 11 at S200 changes the tray-setting information for the sensed tray, to a setting value set in the frequent-use setting corresponding to the selected frequent-use-setting-value button 49, and this flow goes to S170.

Figure 8:
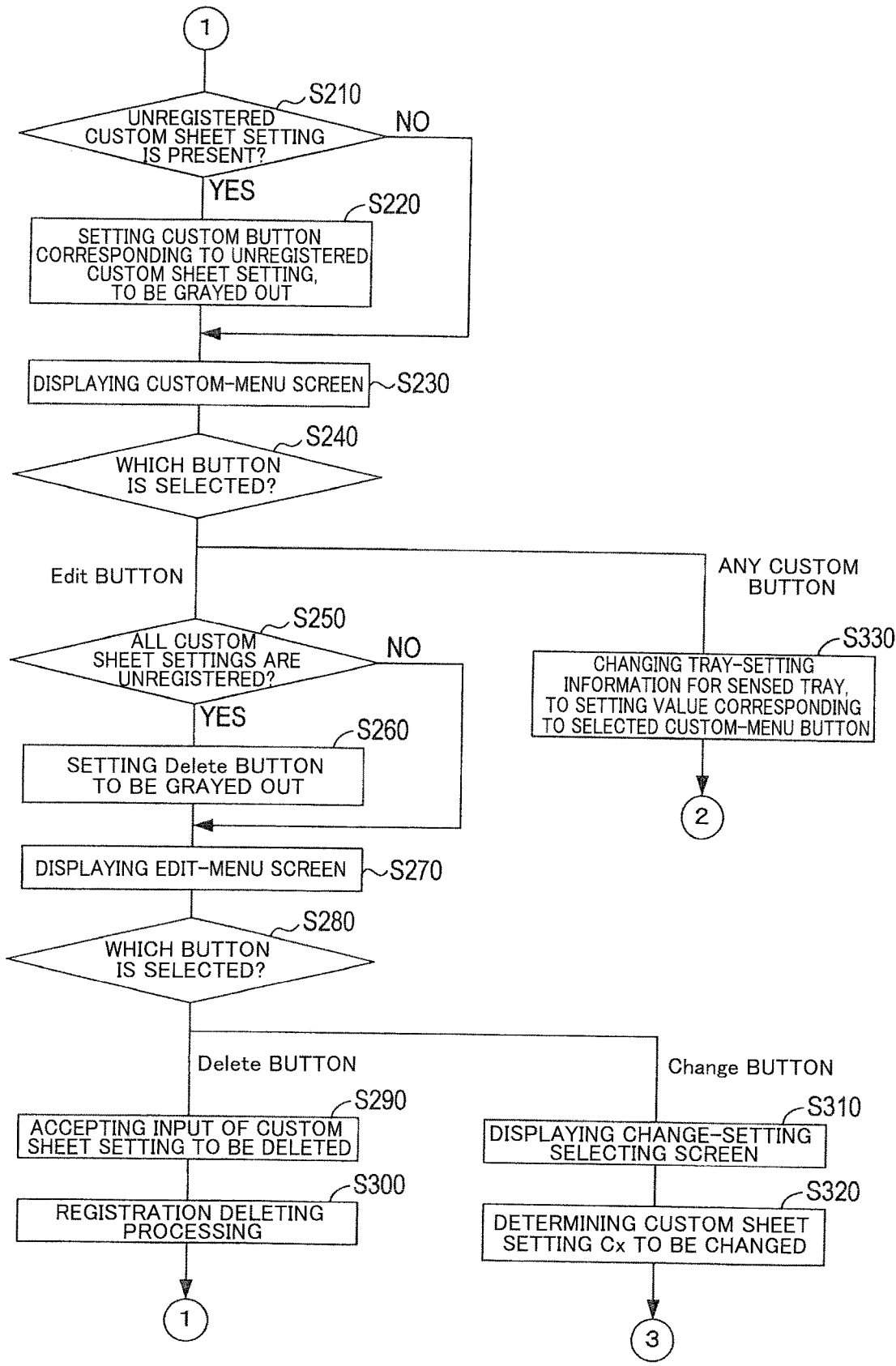
FIG. 8 is a flowchart representing another portion of the tray setting process (continued from FIG. 7)
Figure 9:
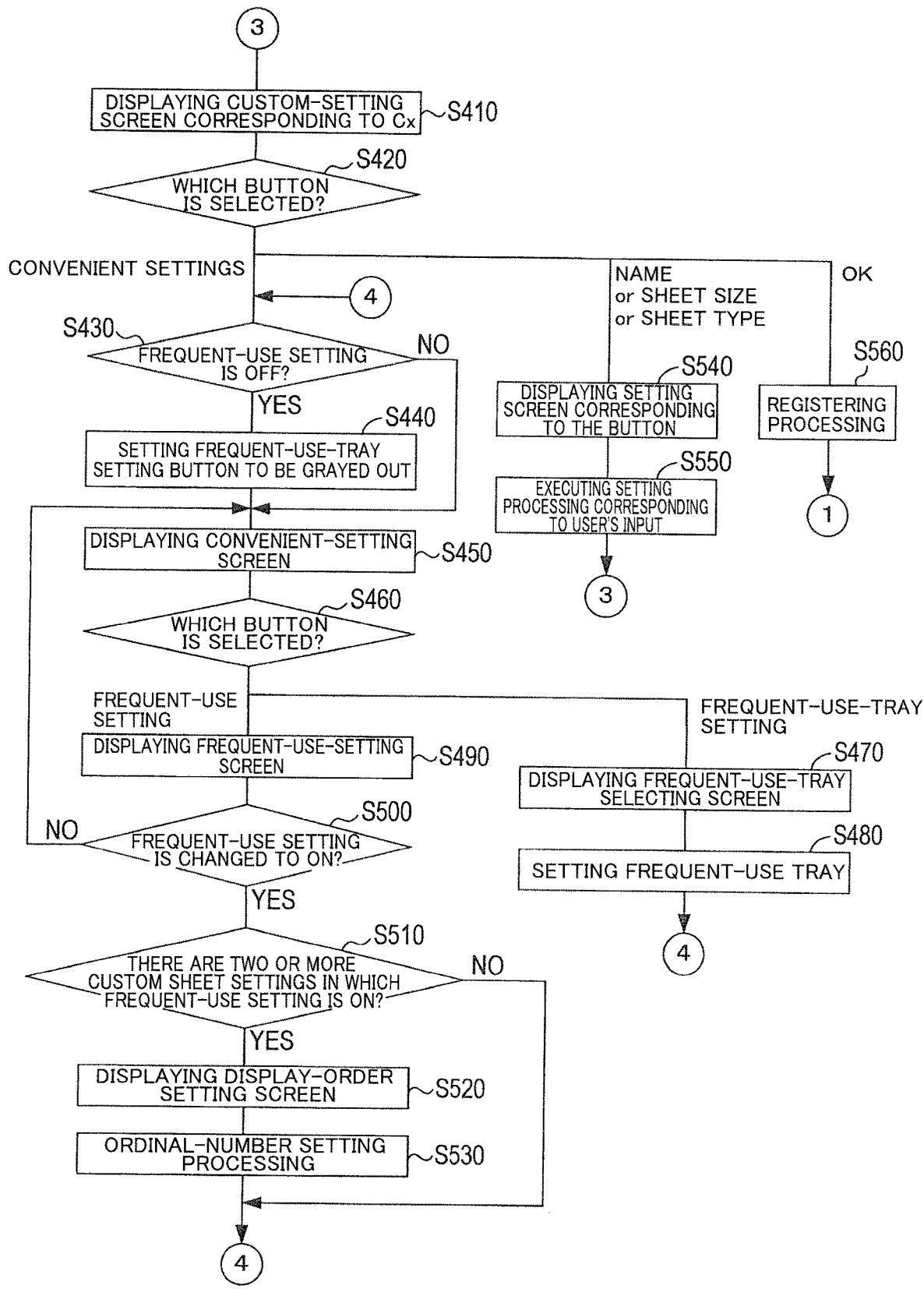
FIG. 9 is a flowchart representing yet another portion of the tray setting process (continued from FIG. 8).

When the controller 11 determines at S160 that the custom-menu button 47 is selected on the tray-setting screen, this flow goes to S210 (see FIG. 8). The controller 11 at S210 determines whether an unregistered custom sheet setting is present. When the unregistered custom sheet setting is absent, that is, when the combination of the sheet type and the sheet size is registered for each of the custom sheet settings C1-C3, this flow goes to S230. When the unregistered custom sheet setting is present, this flow goes to S220. The controller 11 at S220 sets the custom button corresponding to the unregistered custom sheet setting so as to gray out the custom button.

The controller 11 at S230 displays the custom-menu screen 50 (see FIG. 2) on the display device 13. On this screen, the custom button set at S220 so as to be grayed out is grayed out so as not to accept selection of the custom button. The controller 11 at S240 determines which button is selected on the custom-menu screen 50. When any custom button is selected on the custom-menu screen 50, this flow goes to S330. The controller 11 at S330 changes the tray-setting information for the sensed tray, to a setting value of the custom sheet setting corresponding to the selected custom-menu button. After the processing at S330, this flow goes to S170 (see FIG. 7).

When the controller 11 at S240 determines that the Edit button 54 is selected on the custom-menu screen 50, this flow goes to S250. The controller 11 at S250 determines whether all the custom sheet settings are unregistered. When at least one registered custom sheet setting is present, this flow goes to S270. When all the custom sheet settings are unregistered, this flow goes to S260.

The controller 11 at S260 sets the Delete button 57 so as to gray out the Delete button 57. The controller 11 at S270 displays the edit-menu screen 55 (see FIG. 2) on the display device 13. On this screen, the Delete button 57 is grayed out so as not to accept selection of the Delete button 57, in the case where the Delete button 57 is set to be grayed out at S260.

The controller 11 at S280 determines which button is selected on the edit-menu screen 55. When the Delete button 57 is selected on the edit-menu screen 55, this flow goes to S290. The controller 11 at S290 accepts the custom sheet setting to be deleted. The controller 11 at S300 deletes registration of the custom sheet setting accepted at S290. After the processing at S300, this flow goes to S210.

It is noted that the registration deleting processing at S300 includes a processing for changing various setting values of the custom sheet setting accepted at S290, to initial values, for example. Specifically, for example, the name of the custom sheet setting is set to a custom sheet setting Cn as an initial value (n is any of 1 to 3), the sheet size and the sheet type are changed to an unset state, the frequent-use setting is set to OFF, and the frequent-use tray is set to "All" as an initial value.

When the controller 11 at S280 determines that the Change button 56 is selected on the edit-menu screen 55, this flow goes to S310. The controller 11 at S310 displays the change-setting selecting screen 59 (see FIG. 3) on the display device 13. The controller 11 at S320 determines a custom sheet setting Cx to be changed (x is any of 1 to 3) in response to user's selection on the change-setting selecting screen 59, and this flow goes to S410 (see FIG. 9).

The controller 11 at S410 controls the display device 13 to display the custom-setting screen 60 (see FIG. 3) corresponding to the custom sheet setting Cx. The controller 11 at S420 determines which button is selected on the custom-setting screen 60.

When the OK button 65 is selected, the controller 11 at S560 registers the combination of the sheet type and the sheet size of the present custom sheet setting, as the custom sheet setting, and this flow returns to S210.

When any of the Name button 61, the Sheet Type button 62, and the Sheet Size button 63 is selected on the custom-setting screen 60, this flow goes to S540. The controller 11 at S540 displays the setting screen corresponding to the selected button. The controller 11 at S550 sets the corresponding setting value (the name, the sheet type, or the sheet size) in response to user's input on the setting screen. After the processing at S550, this flow returns to S410, and the controller 11 displays the custom-setting screen 60 corresponding to the custom sheet setting Cx again.

When the controller 11 at S420 determines that the Convenient Settings button 64 is selected on the custom-setting screen 60, this flow goes to S430. The controller 11 at S430 determines whether the frequent-use setting of the custom sheet setting Cx is set at OFF. When the frequent-use setting of the custom sheet setting Cx is set at OFF, this flow goes to S450. When the frequent-use setting of the custom sheet setting Cx is set at ON, this flow goes to S440.

The controller 11 at S440 sets the frequent-use-tray setting button 72 so as to gray out the frequent-use-tray setting button 72. The controller 11 at S450 displays the convenient-setting screen 70 (see FIG. 3) on the display device 13. On this screen, the frequent-use-tray setting button 72 is grayed out so as not to accept selection of the frequent-use-tray setting button 72, in the case where the frequent-use-tray setting button 72 is set to be grayed out at S440.

The controller 11 at S460 determines which button is selected on the convenient-setting screen 70. When the frequent-use-tray setting button 72 is selected on the convenient-setting screen 70, this flow goes to S470. The controller 11 at S470 displays the frequent-use-tray selecting screen 75 (see FIG. 4) on the display device 13. The controller 11 at S480 sets the frequent-use tray in response to user's input on the frequent-use-tray selecting screen 75. After the processing at S480, this flow goes to S430.

When the controller 11 at S460 determines that the Frequent-use Setting button 71 is selected on the convenient-setting screen 70, this flow goes to S490. The controller 11 at S490 displays the frequent-use-setting screen 80 (see FIG. 4) on the display device 13. The controller 11 at S500 determines whether the frequent-use setting is changed from OFF to ON, that is, the controller 11 determines whether the ON button 82 is selected on the frequent-use-setting screen 80 in the state in which the frequent-use setting is OFF. When the frequent-use setting is not changed from OFF to ON, this flow goes to S450. When the frequent-use setting is changed from OFF to ON, the controller 11 registers the custom sheet setting Cx as the frequent-use setting, and this flow goes to S510.

The controller 11 at S510 determines whether there are two or more custom sheet settings in each of which the frequent-use setting is set at ON. That is, the controller 11 determines whether there are two or more custom sheet settings each registered as the frequent-use setting. When one custom sheet setting in which the frequent-use setting is set at ON is present, this flow goes to S430. When two or more custom sheet settings in each of which the frequent-use setting is set at ON are present, this flow goes to S520.

The controller 11 at S520 displays the display-order setting screen 85 (see FIG. 4) on the display device 13. As described with reference to FIG. 4, in accordance with user's input on the display-order setting screen 85, the controller 11 at S530 sets the ordinal number of each of the custom sheet settings to be displayed on the tray-setting screen as the frequent-use-setting-value button 49. After the processing at S530, that is, when the OK button 88 is selected on the display-order setting screen 85, this flow goes to S430.

4. Effects

The above-described embodiment achieves the effects described below. That is, the sheet type and the sheet size are associated with any tray and registered as the frequent-use setting in the image processing apparatus 10 according to the present embodiment, whereby the frequent-use-setting-value button 49 corresponding to the registered frequent-use setting can be displayed on the tray-setting screen corresponding to the tray. By selecting the frequent-use-setting-value button 49, the user can easily set the sheet type and the sheet size corresponding to the frequent-use-setting-value button 49, to the sheet type and the sheet size of the recording sheet placed on the tray.

That is, in the case where the user wants to register the sheet type and the sheet size registered as the frequent-use setting, as the tray-setting information, for example, the user can register the sheet type and the sheet size with a considerably small number of operations by selecting the frequent-use-setting-value button 49 though a large number of operations are required in the case where the user registers the sheet type and the sheet size with screen transition starting from the Manual Setting button 48.

In the present embodiment, the user can register the combination of a particular sheet type and a particular sheet size, as the custom sheet setting in advance. The user can also register any of the custom sheet settings as the tray-setting information for any tray. That is, by registering the combination of the sheet type and the sheet size with a possibility of frequent use, as the custom sheet setting, for example, the user can easily register the combination as the tray-setting information for any tray as needed.

The user can register the registered custom sheet setting as the frequent-use setting by associating the registered custom sheet setting with one or more particular trays. This operation allows the user to efficiently register the frequent-use setting. The custom sheet setting may be registered as the frequent-use setting and may not be registered as the frequent-use setting in the case where there is no need to register the custom sheet setting as the frequent-use setting.

In the present embodiment, even in the case where the frequent-use setting corresponding to the sensed tray, when the content of the frequent-use setting matches the tray-setting information for the sensed tray set at present, the frequent-use-setting-value button 49 corresponding to the frequent-use setting is displayed on the tray-setting screen. This is because the tray-setting information for the sensed tray set at present is displayed on the Not Change button 46 in this case. Thus, it is possible to prevent a plurality of the same buttons substantially on the tray-setting screen.

In the present embodiment, each of the sheet type and the sheet size is one example of a setting item. Each of the first-tray sensor 23, the second-tray sensor 24, and the sheet sensor 25 is one example of a sensor. Information which is to be registered as the frequent-use setting and in which the custom sheet setting and the tray are associated with each other is one example of tray relating information. The frequent-use-setting-value button 49 is one example of a related-setting-item object. The Not Change button 46 is one example of a present-setting-item object. The custom-menu button 47 is one example of an item setting object. The first custom button 51 is one example of a combination object. The change-setting selecting screen 59 is one example of a combination selecting screen. The frequent-use-tray selecting screen 75 is one example of a tray selecting screen. The display-order setting screen 85 is one example of a display-position determining screen.

5. Modifications

While the embodiment has been described above, it is to be understood that the disclosure is not limited to the details of the illustrated embodiment, but may be embodied with various changes and modifications, which may occur to those skilled in the art, without departing from the spirit and scope of the disclosure.

5-1. First Modification

While the tray-setting information settable for each tray contains the sheet type and the sheet size in the above-described embodiment, this configuration is one example. The tray-setting information may contain any setting element. For example, the tray-setting information may contain other setting elements in addition to the sheet type and the sheet size. In another example, the tray-setting information may contain only one of the sheet type and the sheet size. In yet another example, the tray-setting information may contain: one of the sheet type and the sheet size; and one or more other setting elements.

5-2. Second Modification

The settable number of the custom sheet settings may be different from three. An upper limit may be provided for the settable number of the custom sheet settings. An upper limit may be provided for the settable number of the frequent-use settings. In this case, an upper limit may be provided for the settable number of the frequent-use settings for each tray to be registered. In the case where the number of the registered frequent-use settings is greater than the upper limit when the display device 13 displays the display-order setting screen 85, the display device 13 may display a screen for notifying the user that the number of the registered frequent-use settings is greater than the upper limit.

5-3. Third Modification

The number of the trays in the image processing apparatus may be any number other than three. Each tray in the image processing apparatus may be of any type.

5-4. Other Modifications

The plurality of functions of one element in the above-described embodiment may be achieved by a plurality of elements, and one function of one element may be achieved by a plurality of elements. A plurality of functions of a plurality of elements may be achieved by one element, and one function achieved by a plurality of elements may be achieved by one element. The configurations in the above-described embodiment may be omitted partly. At least a portion of the configurations in the above-described embodiment may be added to or replaced with another portion of the configurations in the above-described embodiment.

What is claimed is:

1. An image processing apparatus, comprising:
   at least one tray configured to support a recording medium;
   a sensor provided for each of the at least one tray and configured to sense that a particular operation is performed for a corresponding one of the at least one tray;
   a display device;
   an input interface; and
   a controller configured to
     register at least one piece of tray relating information in which one of the at least one tray and a setting item for specifying the recording medium are associated with each other,
     when the sensor has detected that the particular operation is performed for a first tray as one of the at least one tray, and first-tray information indicating a setting item associated with the first tray is registered as one of the registered at least one piece of tray relating information, determine whether the registered first-tray information matches a setting item set at present for the first tray,
     when it is determined that the registered first-tray information does not match the setting item set at present for the first tray, control the display device to display a tray-setting screen, containing a related-setting-item object, for accepting an input for a setting item for the recording medium to be placed on the first tray, the related-setting-item object indicating the setting item, of the registered first-tray information, which is associated with the first tray,
     when it is determined that the registered first-tray information matches the setting item set at present for the first tray, control the display device to display the tray-setting screen not containing the related-setting-item object of the registered first-tray information, and
     when the related-setting-item object is selected via the input interface in a state in which the tray-setting screen is displayed, set the setting item corresponding to the related-setting-item object, to a setting item for a placing medium that is the recording medium to be placed on the first tray.

2. The image processing apparatus according to claim 1, wherein the particular operation comprises one or more of an operation of removing a tray of the at least one tray from the image processing apparatus, an operation of mounting the tray to the image processing apparatus, and an operation of placing the recording medium onto the tray mounted to the image processing apparatus.

3. The image processing apparatus according to claim 1, wherein the controller is configured to control the display device to display the tray-setting screen containing a present-setting-item object, in addition to the related-setting-item object, indicating a setting item set at present for the first tray.

4. The image processing apparatus according to claim 3, wherein the controller is configured to, when the first-tray information related to the first tray is registered, and the setting item of the first-tray information is different from the setting item set at present for the first tray, control the display device to display the tray-setting screen containing the related-setting-item object indicating the setting item of the registered first-tray information, and the present-setting-item object.

5. The image processing apparatus according to claim 3, wherein the controller is configured to control the display device to display a standby screen different from the tray-setting screen, in response to selection of the present-setting-item object via the input interface in a state in which the tray-setting screen is displayed.

6. The image processing apparatus according to claim 1, wherein the controller is configured to, when the first-tray information is registered, and the setting item of the registered first-tray information matches a setting item set at present for the first tray, control the display device to display the tray-setting screen not containing the related-setting-item object indicating the setting item, of the first-tray information, which is associated with the first tray but containing a present-setting-item object indicating the setting item set at present for the first tray.

7. The image processing apparatus according to claim 6, wherein the controller is configured to control the display device to display the tray-setting screen containing, in addition to the present-setting-item object, an item setting object allowing setting of a setting item for the first tray which is different from the setting item of the present-setting-item object.

8. The image processing apparatus according to claim 1, wherein the setting item comprises a type and a size of the recording medium.

9. The image processing apparatus according to claim 8, wherein the controller is configured to:
   register a piece of combination information representing a combination of the type and the size of the recording medium;
   control the display device to display a combination displaying screen containing a combination object for selection of one of a plurality of the registered pieces of the combination information; and
   in response to selection of the combination object via the input interface in a state in which the combination displaying screen is displayed, set the recording medium of the type and the size corresponding to the one of the plurality of the registered pieces of the combination information, as the placing medium.

10. The image processing apparatus according to claim 8, wherein the controller is configured to:
   register a piece of combination information representing a combination of the type and the size of the recording medium;
   control the display device to display a combination selecting screen for selection of one of a plurality of the registered pieces of the combination information;
   select the one of the plurality of the registered pieces of the combination information in response to selection on the combination selecting screen via the input interface;
   control the display device to display a tray selecting screen for selection of at least one of the at least one tray;
   select the at least one of the at least one tray in response to selection on the tray selecting screen via the input interface; and
   register the tray relating information in which the selected at least one of the at least one tray and the recording medium corresponding to the selected one of the plurality of the registered pieces of the combination information are associated with each other.

11. The image processing apparatus according to claim 1, wherein the controller is configured to:
when a plurality of pieces of the tray relating information are registered, control the display device to display a display-position determining screen for determination of relative display positions on the tray-setting screen for a plurality of the related-setting-item objects corresponding respectively to the registered pieces of the tray relating information;
determine the relative display positions when a position determining operation for determining the relative display positions is performed via the input interface in a state in which the display-position determining screen is displayed; and
control the display device to display the plurality of the related-setting-item objects on the tray-setting screen based on the determined relative display positions.

12. The image processing apparatus according to claim 1, wherein the at least one tray is a plurality of trays.

13. A tray setting method used in an image processing apparatus, the image processing apparatus comprising (i) at least one tray configured to support a recording medium, (ii) a sensor provided for each of the at least one tray and configured to sense that a particular operation is performed for a corresponding one of the at least one tray, (iii) a display device, and (iv) an input interface, the tray setting method comprising:
registering at least one piece of tray relating information in which one of the at least one tray and a setting item for specifying the recording medium are associated with each other;
when the sensor has detected that the particular operation is performed for a first tray as one of the at least one tray, and first-tray information indicating a setting item associated with the first tray is registered as one of the registered at least one piece of tray information, determining whether the registered first tray information matches a setting item set at present for the first tray;
when it is determined that the registered first-tray information does not match the setting item set at present for the first tray, displaying, on the display device, a tray-setting screen, containing a related-setting-item object, for accepting an input for a setting item for the recording medium to be placed on the first tray, the related-setting-item object indicating the setting item, of the registered first-tray information, which is associated with the first tray;
when it is determined that the registered first-tray information matches the setting item set at present for the first tray, displaying, on the display device, the tray-setting screen not containing the related-setting-item object of the registered first-tray information; and
when the related-setting-item object is selected via the input interface in a state in which the tray-setting screen is displayed, setting the recording medium corresponding to the related-setting-item object, to a placing medium that is the recording medium to be placed on the first tray.

14. A non-transitory storage medium storing a plurality of instructions executable by a processor of an image processing apparatus, the image processing apparatus comprising (i) at least one tray configured to support a recording medium, (ii) a sensor provided for each of the at least one tray and configured to sense that a particular operation is performed for a corresponding one of the at least one tray, (iii) a display device, and (iv) an input interface, wherein the plurality of instructions, when executed, causes the image processing apparatus to:
register at least one piece of tray relating information in which one of the at least one tray and a setting item for specifying the recording medium are associated with each other;
when the sensor has detected that the particular operation is performed for a first tray as one of the at least one tray, and first-tray information indicating a setting item associated with the first tray is registered as one of the registered at least one piece of tray information, determine whether the registered first tray information matches a setting item set at present for the first tray;
when it is determined that the registered first-tray information does not match the setting item set at present for the first tray, control the display device to display a tray-setting screen, containing a related-setting-item object, for accepting an input for a setting item for the recording medium to be placed on the first tray, the related-setting-item object indicating the setting item of the registered first-tray information, which is associated with the first tray;
when it is determined that the registered first-tray information matches the setting item set at present for the first tray, control the display device to display the tray-setting screen not containing the related-setting-item object of the registered first-tray information; and
when the related-setting-item object is selected via the input interface in a state in which the tray-setting screen is displayed, set the recording medium corresponding to the related-setting-item object, to a placing medium that is the recording medium to be placed on the first tray.

* * * * *